United States Patent
Horii et al.

(10) Patent No.: US 11,226,683 B2
(45) Date of Patent: Jan. 18, 2022

(54) TRACKING STYLUS IN A VIRTUAL REALITY SYSTEM

(71) Applicant: HEWLETT-PACKARD DEVELOPMENT COMPANY, L.P., Spring, TX (US)

(72) Inventors: Hiroshi Horii, Palo Alto, CA (US); Ian N Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,480

(22) PCT Filed: Apr. 20, 2018

(86) PCT No.: PCT/US2018/028529
§ 371 (c)(1),
(2) Date: Oct. 18, 2019

(87) PCT Pub. No.: WO2019/203848
PCT Pub. Date: Oct. 24, 2019

(65) Prior Publication Data
US 2021/0333875 A1    Oct. 28, 2021

(51) Int. Cl.
G06F 3/01        (2006.01)
G06F 3/0354    (2013.01)
G06T 7/73        (2017.01)
G06F 3/03        (2006.01)
G06T 7/246      (2017.01)
G06F 3/0346    (2013.01)

(52) U.S. Cl.
CPC ............ *G06F 3/014* (2013.01); *G06F 3/0304* (2013.01); *G06F 3/0346* (2013.01); *G06F 3/03546* (2013.01); *G06T 7/248* (2017.01); *G06T 7/74* (2017.01)

(58) Field of Classification Search
CPC ...... G06F 3/014; G06F 3/0304; G06F 3/0346; G06F 3/03546; G06T 7/74; G06T 7/248
See application file for complete search history.

(56) References Cited

U.S. PATENT DOCUMENTS

| 4,954,817 A | 9/1990 | Levine |
| 5,489,922 A * | 2/1996 | Zloof ................... G06F 3/0362 345/156 |
| 6,110,130 A * | 8/2000 | Kramer ................ A61B 5/1071 600/587 |

(Continued)

FOREIGN PATENT DOCUMENTS

WO    WO-2005050531 A3    12/2006

OTHER PUBLICATIONS

Wu, Po-Chen, et al., DodecaPen: Accurate 6DoF Tracking of a Passive Stylus, ACM, UIST 2017, Oct. 22-25, 2017, 10 pages.

(Continued)

*Primary Examiner* — Ariel A Balaoing
(74) *Attorney, Agent, or Firm* — HP Inc. Patent Dept.

(57) ABSTRACT

An apparatus is disclosed to monitor movement of a held object in a virtual reality system. The apparatus comprises a primary tracking system with a first sensor to monitor movement of the user's hand, and a secondary tracking system with a second sensor to monitor a position of the held object. The position is measured in relation to the hand movement.

14 Claims, 11 Drawing Sheets

(56) References Cited

U.S. PATENT DOCUMENTS

| | | | |
|---|---|---|---|
| 9,096,093 B2 | 8/2015 | Pemberton-Pigott | |
| 9,710,064 B2 | 7/2017 | Grant et al. | |
| 2002/0024675 A1* | 2/2002 | Foxlin | G06F 3/0346 356/620 |
| 2003/0214481 A1 | 11/2003 | Xiong | |
| 2005/0052412 A1* | 3/2005 | McRae | G06F 3/014 345/158 |
| 2006/0028457 A1* | 2/2006 | Burns | G06F 3/0421 345/179 |
| 2007/0081695 A1* | 4/2007 | Foxlin | G06T 7/73 382/103 |
| 2007/0132662 A1* | 6/2007 | Morita | H04N 13/366 345/8 |
| 2009/0209343 A1* | 8/2009 | Foxlin | G06F 3/0346 463/36 |
| 2011/0210931 A1 | 9/2011 | Shai | |
| 2015/0277596 A1* | 10/2015 | Hoffman | G06F 3/016 345/179 |
| 2015/0301592 A1* | 10/2015 | Miller | G06F 3/012 345/156 |
| 2016/0306422 A1 | 10/2016 | Parham et al. | |
| 2016/0313798 A1* | 10/2016 | Connor | A61B 5/0059 |
| 2017/0242496 A1* | 8/2017 | Park | G06K 9/00087 |
| 2017/0308165 A1 | 10/2017 | Erivantcev et al. | |
| 2017/0315620 A1 | 11/2017 | Johri | |
| 2018/0018057 A1* | 1/2018 | Bushnell | G06F 3/0412 |
| 2019/0369749 A1* | 12/2019 | Hong | G05D 1/0016 |
| 2019/0369752 A1* | 12/2019 | Ikeda | G02B 27/017 |
| 2020/0042111 A1* | 2/2020 | Connellan | G02B 27/0172 |
| 2020/0278763 A1* | 9/2020 | Munakata | G06F 3/03545 |

OTHER PUBLICATIONS

Fiorentino, Michele, et al., The SenStylus: A Novel Rumble-Feedback Pen Device for CAD Application in Virtual Reality, Jan. 31-Feb. 4, 2005, WSCG 2005, 8 pages.

Kry, Paul G et al., HandNavigator: Hands on Interaction for Desktop Virtual Reality, Nov. 3, 2008, HAL Archives, 9 pages.

* cited by examiner

TRACKING STYLUS IN A VIRTUAL REALITY SYSTEM

BACKGROUND

Many computer applications, of interest to workstations in particular (e.g., computer-aided design (CAD), media, and entertainment) rely on precision input. Current virtual reality (VR) or augmented reality (AR) controller technologies are not well-suited to capturing the precise motions of the human hand.

BRIEF DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1, numbers in the 200 series refer to features originally found in FIG. 2, and so on.

DETAILED DESCRIPTION

In accordance with the examples described herein, a method and apparatus are disclosed to enable precise tracking of a hand-held stylus to be used in a virtual reality space. The apparatus consists of primary and secondary tracking systems. The primary tracking system, which monitors movement of a user's hand, includes a sensor that is attached to the user's hand. The secondary tracking system includes at least one additional sensor, with which position and orientation movement of the held stylus is monitored. Several example implementations are described. A tip sensor may additionally detect motion of the stylus over a surface and/or contact with the surface. Precise tracking of the stylus movement in a virtual reality setting, including the ability to discern letter writing on a surface or on air, is possible.

Figure 1:
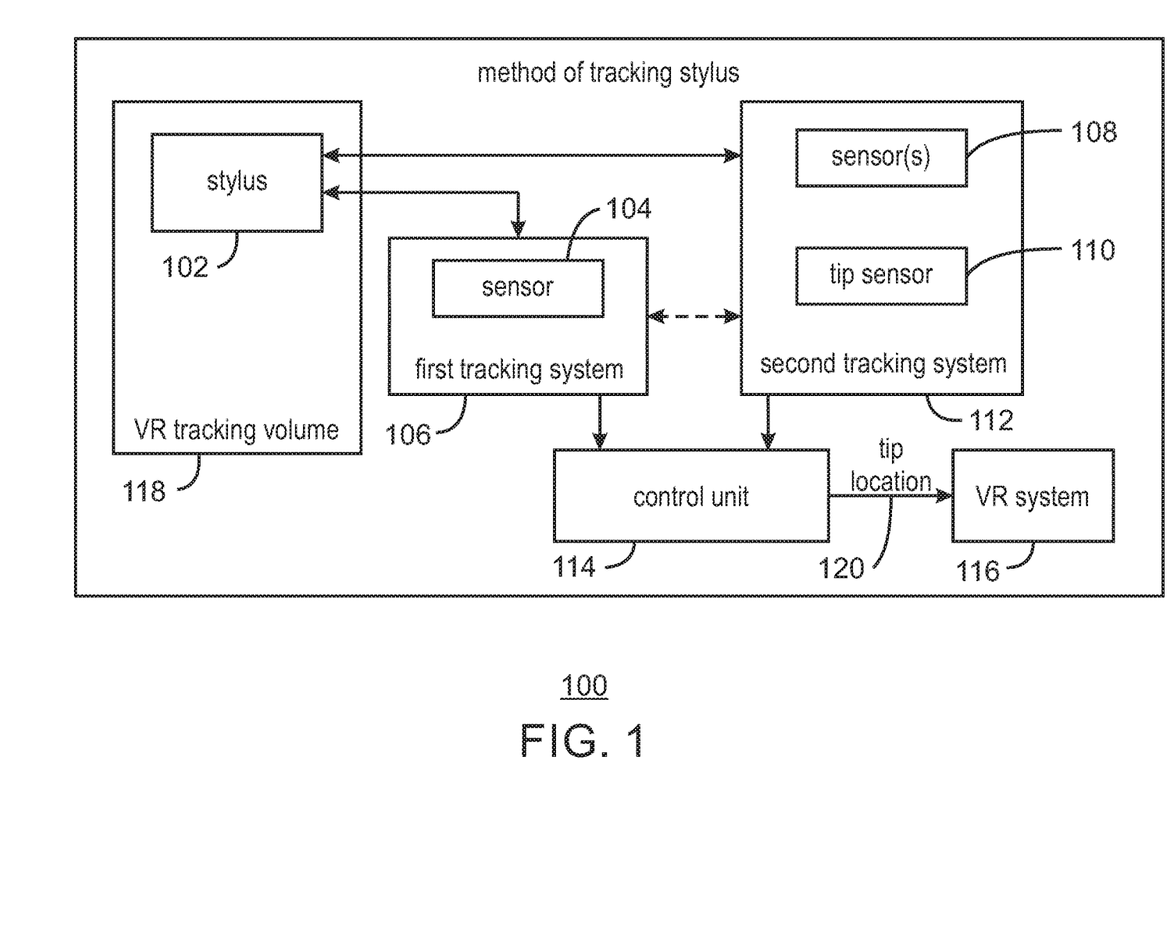
FIG. 1 is a schematic block diagram of a method of tracking a stylus in a virtual reality system, according to examples.

FIG. 1 is a schematic block diagram of a method of tracking a stylus 100, according to examples. The method 100 works with a stylus 102 that is used within a virtual reality (VR) tracking volume 118. A stylus is a pen-shaped device typically used to input commands to a computer screen, mobile device, or graphics tablet. As used herein, the VR tracking volume 118 comprises a physical space of a certain volume in which a user, with the help of a VR peripheral such as a headset, engages with the VR environment that is visible to the user. This volume is typically constrained by the range limits of the sensors tracking the user's headset and other VR peripherals, such as hand controllers, and/or by physical obstacles in the space, such as walls and furniture. In contrast to typical stylus applications (computer, mobile, or tablet input device), the stylus 102 provides as input, the location of its tip, to a virtual reality system 116. The system may be a processor with an attached headset, or a self-contained VR headset.

The stylus 102 is to be placed in the hand of a user and held much like a pen or pencil. The stylus 102 is coupled to both a first tracking system 106 and a second tracking system 112. The first tracking system 106 monitors gross (large) movement of the stylus 102 within the VR tracking volume 118 and may also be referred to herein as the gross tracking system. Movement of the hand holding the stylus 102 is tracked by a sensor 104 of the gross tracking system 106. The second tracking system 112 monitors fine (small) movement of the stylus 102 within the VR tracking volume 118 and may also be referred to herein as the fine tracking system. Movement of a tip of the stylus 102 is monitored or tracked by a sensor 108 of the fine tracking system 112. A dashed arrow disposed between the first and second tracking systems indicates that the two tracking mechanisms may optionally be physically connected to one another.

A control unit or mechanism 114 receives information from both the first tracking system 106 and the second tracking system 112. Based on the sensory data received, the control unit 114 sends information 120 to a VR device 116. In an example, the information 120 is a precise location of the tip of the stylus within the VR tracking volume 118. The VR device 116 may be a headset or other VR peripheral worn by the user holding the stylus 102. The stylus-to-tracking systems information may be relayed separately to the control unit 114, or combined in the hand-worn device to provide a single set of 6DOF coordinates.

In some examples, the method 100 enables precision tracking of the stylus 102 by combining a hand-worn VR tracker (first tracking system 106) with one or more dedicated tracking sensors (second tracking system 112) between the hand-worn tracker and the stylus being manipulated by the user's fingers. The method 100 thus provides precise, pen-based input anywhere within the VR tracking volume.

Current six degrees of freedom (6DoF) tracking systems for VR peripherals may be accurate down to a few millimeters and a few degrees. These VR tracking systems tend to be large, as compared to a conventional stylus, due to the physical sensor separations used to optically triangulate the position of the VR peripheral. Current VR tracking systems are thus unsuitable to use with a stylus, for example, as these systems are unable to track fine motions of the stylus tip, such as when the user moves the stylus along a surface, or in the air, to "write" a letter or number.

Returning to FIG. 1, the first tracking system 106 emulates the tracking capability of current VR systems, in one example, to monitor movement of the user's hand. The second tracking system 112, by contrast, monitors the stylus motion with respect to the user's hand.

The second tracking system 112 optionally includes a tip sensor 110 disposed upon the tip of the stylus 102. The tip sensor 110 is used to increase the accuracy with which the stylus tip is tracked using the first sensor 108, in one example. Thus, the first sensor 108 and the tip sensor 110 work together to track the stylus 102. Further, the sensor 108 may actually comprise more than one sensor.

The control unit 114 receives sensor data from both the first tracking system 106 and the second tracking system 112. The control unit 114 may be a processor-based system executing software to process the data, as one example. Or, the control unit 114 may be implemented using discrete logic (hardware). Or, the control unit 114 may utilize both hardware and software components to process the incoming data. Once the data has been processed by the control unit 114, a tip location 120 is sent to the VR system 116.

In the following pages, several example implementations of the stylus tracking method 100 are described in detail. The illustrations depict a right-handed user holding a stylus, but the examples described herein may also be implemented for left-handed users.

Figure 2:
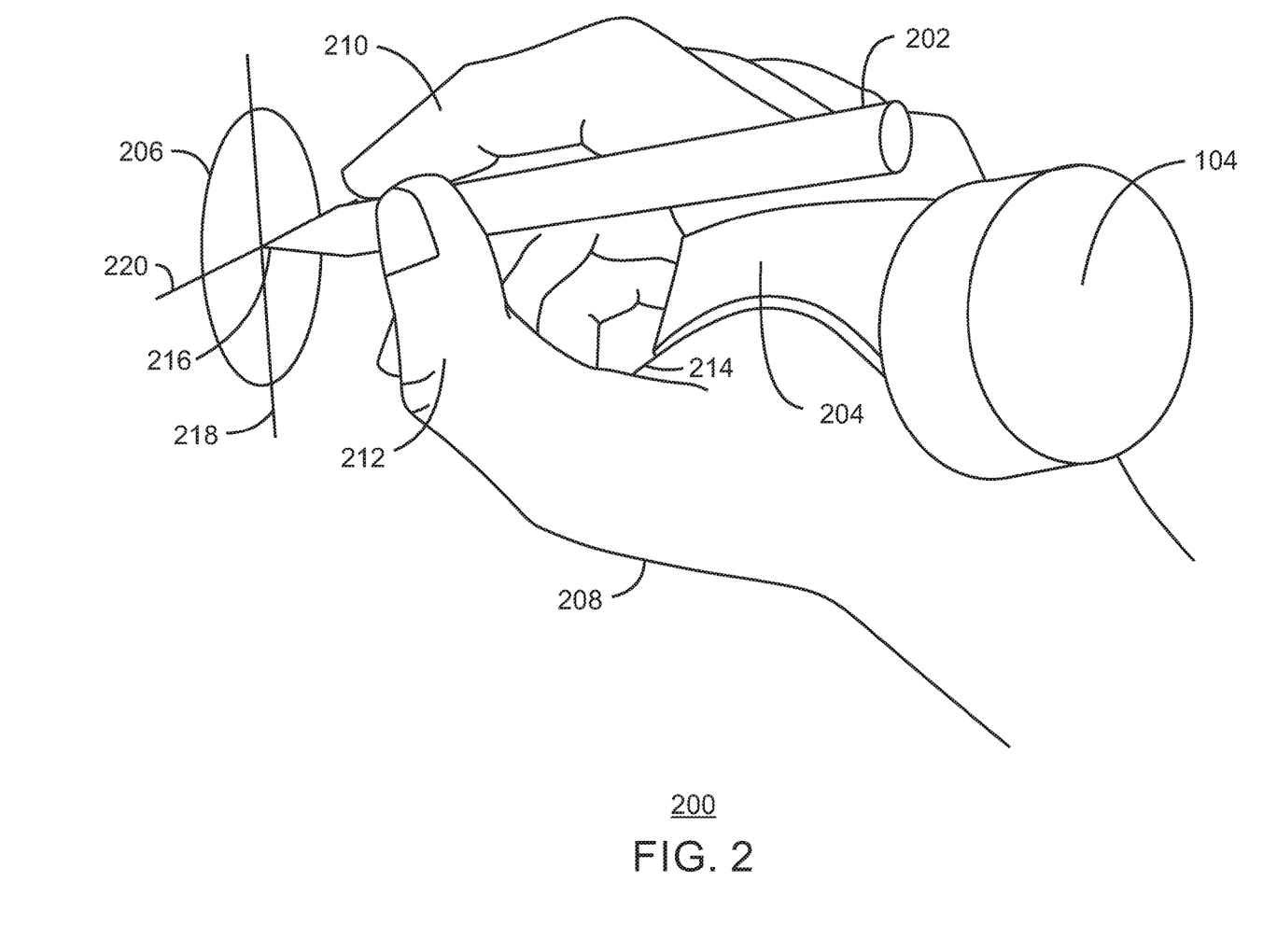
FIG. 2 is a diagram of an apparatus to implement the stylus tracking method of FIG. 1, according to examples.

FIG. 2 is a diagram of an apparatus 200 to implement the stylus tracking method 100 of FIG. 1, according to examples. A stylus 202 is shown in a hand 208 of a user. Like a pen or pencil, the stylus 202 is disposed between the thumb 212 and index finger 210 of the hand 208.

The sensor 104 of the first tracking system 106 is shown atop a palm 214 of the hand 208. In FIG. 2, sensor 104 is coupled to a sleeve 204 connects to a bottom portion of the sensor and wraps around the palm 214, leaving the hand 208 free to move the stylus 202. The sleeve 204 may comprise a closed loop, such as of a stretchable fabric, where the user slides four fingers including the index finger 210 through the sleeve until the sensor 204 rests on the palm 214. The sleeve 204 may "clip" over the base of the user's thumb 212 as shown, allowing it be more readily picked up and put down (vs a glove). In another example, the sleeve is replaced with a glove (not shown). The sensor 104 tracks the motion of the palm 214, in one example.

The stylus 202 includes a tip or nub 216. A typical computer stylus, for example, would engage the tip of the stylus with a surface, such as a computer screen or tablet, which would invoke a response. For example, where the stylus tip engages with a "select" button on a tablet, a select operation would follow. In the world of VR, a stylus tip may engage with an actual physical surface. Or, the stylus tip may engage with a virtual surface, which is not an actual physical surface, where the virtual surface is visible to a user wearing a VR headset, for example. The principles of the stylus tracking method 100 described herein are capable of tracking the stylus tip, whether the tip engages with a surface or not.

An approximate range of motion 206 of the stylus tip 216 on a surface, with respect to the user's hand 208, is indicated in FIG. 2. Even when the hand 208 does not move, the movement of the stylus tip 216 may be made by movement of the index finger 210 and thumb 212. A movement of the index finger 210 up or down, for example, may produce the vertical line 218 while coordinated movement of the index finger 210 and thumb 212 may produce the horizontal line 220. In some cases, the hand 208 may be moved while the user is writing.

Thus, with the user's hand 208 being stationary, the user can still manipulate the tip 216 of the stylus 202 with the index finger 210 and thumb 212 over roughly a square inch of surface area with sub-millimeter precision using finger motion, in one example.

Figure 3A:
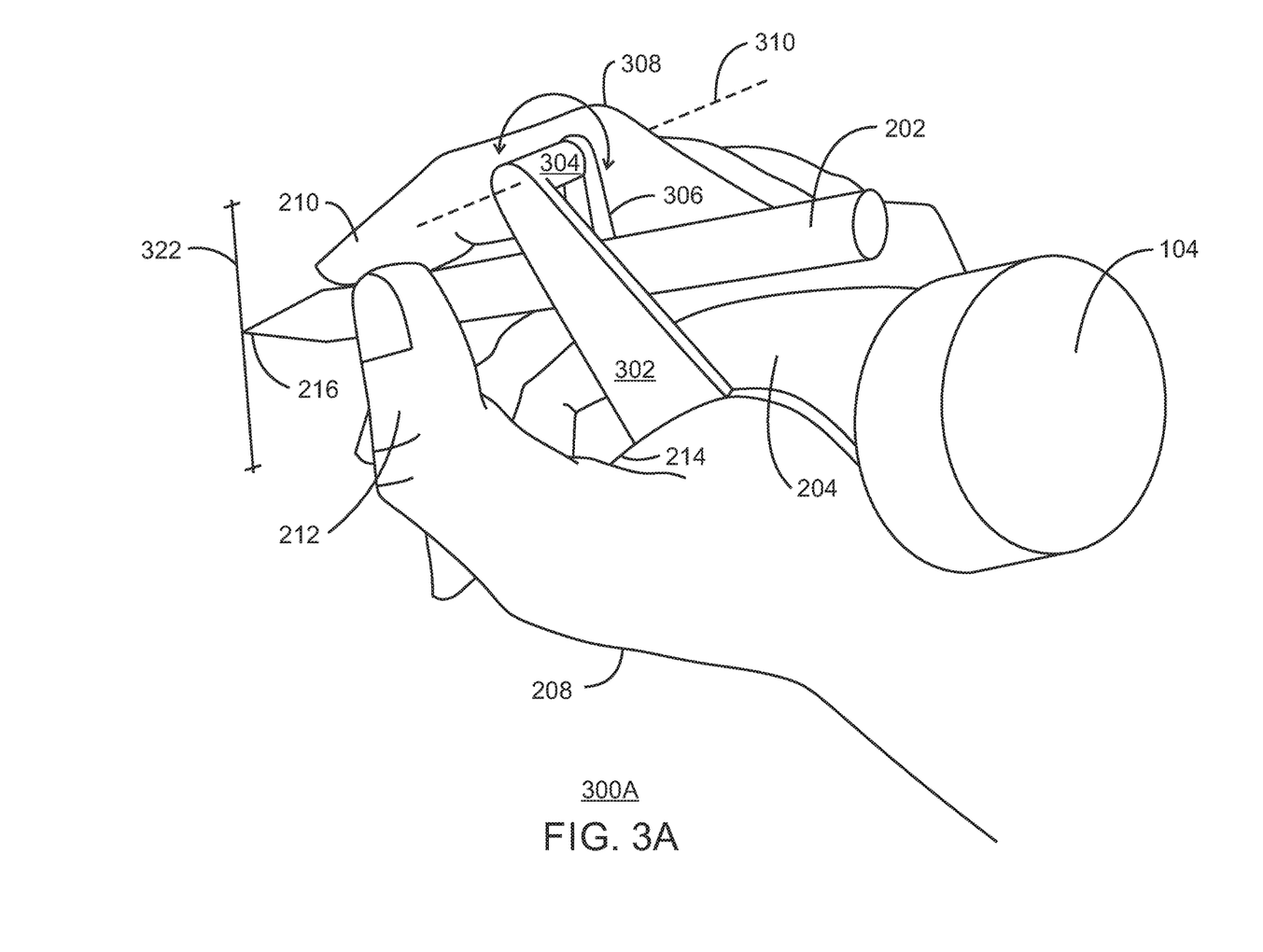
FIGS. 3A and 3B are diagrams of a mechanical apparatus to implement the stylus tracking method of FIG. 1, according to examples.
Figure 3B:
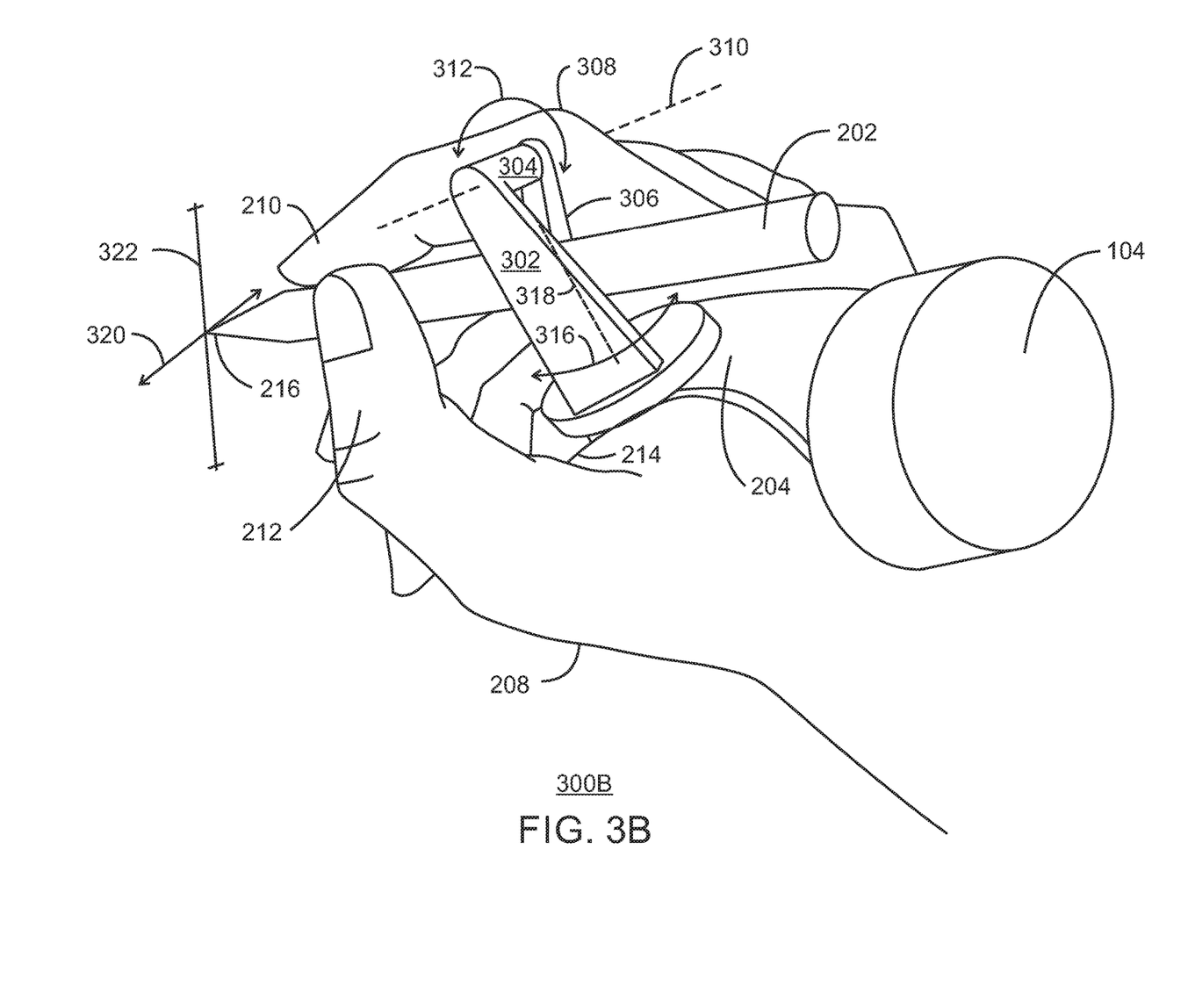

FIGS. 3A and 3B are diagrams of a mechanical apparatus 300 to implement the stylus tracking method 100 of FIG. 1, according to examples. The mechanical apparatus 300 is illustrated in two parts, as apparatus 300A (FIG. 3A) and as apparatus 300B (FIG. 3B), respectively (collectively, "apparatus 300"). The first tracking system of the mechanical apparatus 300 is the sensor 104 coupled to the hand 208 by the sleeve 204, as before. The second tracking system of the mechanical apparatus 300 comprises a mechanical linkage capturing the position of the stylus 202, and thus the stylus tip 216. While a freely moving stylus may typically be moved within a roughly elliptical area by the user's fingers when the hand is held stationary, a larger component of that motion is governed by rotation about the first joint of the user's index finger. Capturing that motion captures the bulk of the typical pen motion with respect to the hand.

Thus, in FIG. 3A, the mechanical linkage of the apparatus 300 comprises a projection 302 coupled to the sleeve 204, a cylinder 304 orthogonal to the projection, and a connection 306 to the stylus 202. The projection 302 projects upward from the palm 214 of the hand 208 and is disposed to the left of the stylus 202. Connected to the projection, the cylinder 304 is disposed to the left of a knuckle 308 of the index finger 210. In an example, the cylinder 304 is roughly co-axial with the knuckle 308, with the dotted line 310 indicating the axis shared by the knuckle and cylinder. The connection 306 is fixably attached to the stylus 202, in one example, and is approximately parallel to the projection 302. In one example, the pivot 304 comprises a rotational encoder (not shown). When the pivot 304 rotates, as indicated by the arrow 312, the rotational encoder tracks up and down movement 308 of the stylus tip 216 and sends the information to the control unit 114 (FIG. 1). The ability to track a simple up-and-down motion of the stylus 202 may be sufficient for some applications.

In FIG. 3B, however, the mechanical apparatus 300B further includes means to track the left and right motion of the stylus 202, according to examples. In addition to the components shown in FIG. 3A, the mechanical apparatus 300B includes the projection 302 coupled to the cylinder 304 at one end, and to a disc 314 at its other end. Like the pivot 304, the disc 314 may include a rotational encoder (not shown), in this case, to track the left and right motion of the stylus 202. When the stylus 202 moves left to right or right to left, such as along the line 320, the disc 314 moves as indicated by the arrow 316. The mechanical apparatus 300B thus tracks both up-and-down motion and left-and-right motion of the stylus.

Figure 4:
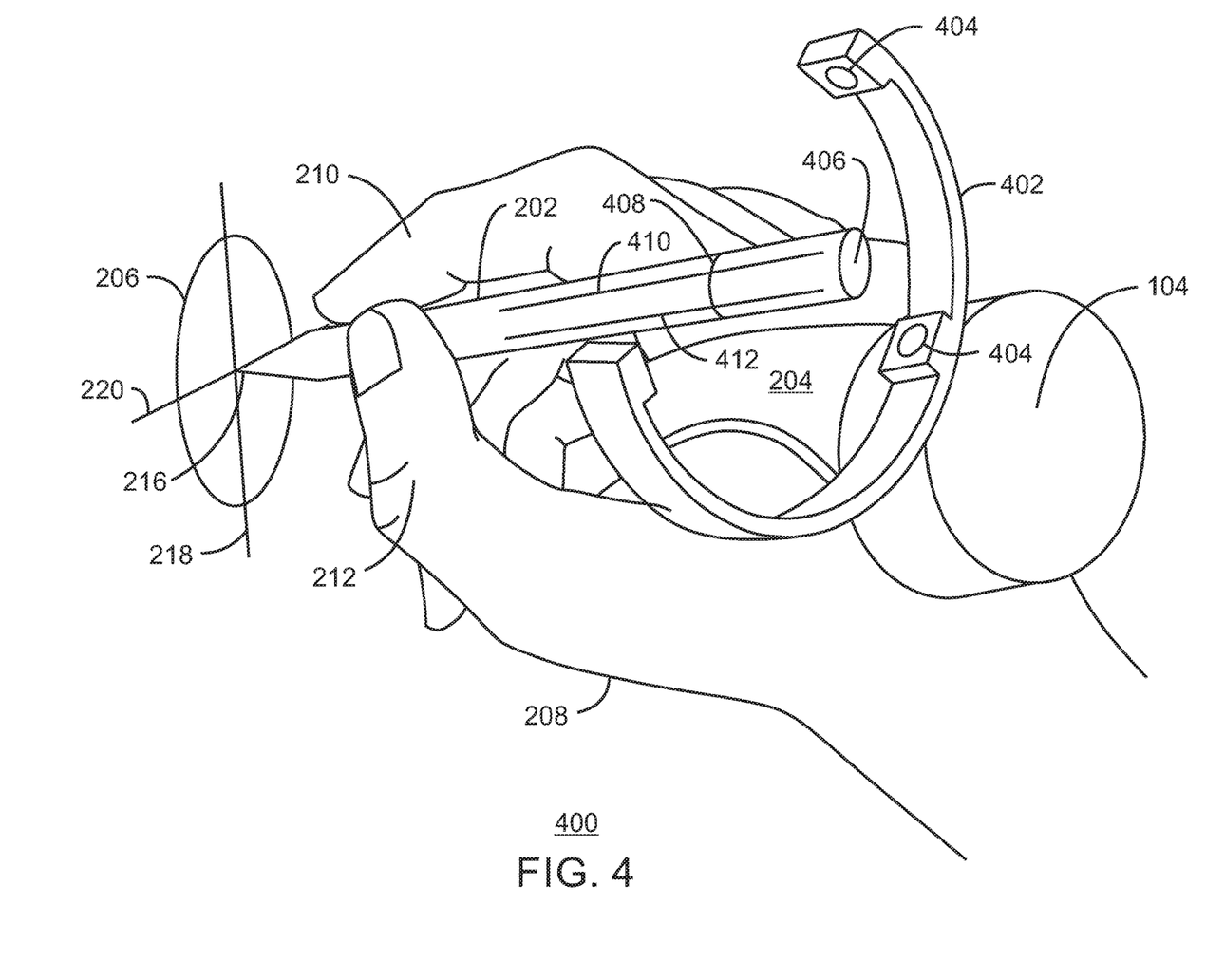
FIG. 4 is a diagram of an optical apparatus to implement the stylus tracking method of FIG. 1, according to examples.

FIG. 4 is a diagram of an optical apparatus 400 to implement the stylus tracking method 100 of FIG. 1, according to examples. The first tracking system of the optical apparatus 400 is the sensor 104 coupled to the hand 208 by the sleeve 204, as before. The second tracking system of the optical apparatus 400 comprises an attachment 402 comprising cameras 404 to capture the position of the stylus 202, and thus the stylus tip 216.

The attachment 402 is coupled to the hand sensor 104 and partially surrounds an end portion 406 of the stylus 202 that is opposite to the tip 216. In the illustration of FIG. 4, the attachment 402 is shaped like a partial slice of a cylinder and is disposed so as to partially surround the end 406 of the stylus 202. In examples, in an initial state, the attachment 402 is positioned such that the cameras 404 are approximately equidistant from the end 406 of the stylus 202.

In the optical apparatus 400, although the attachment 402 is coupled to the sensor 104 of the first tracking system, the stylus 202 is free to move with respect to the hand-worn portion. The attachment 402 is designed so as to not interfere with the range of motion of the stylus 202. In one example, the attachment 402 includes two or more cameras 404 that encircle the volume typically occupied by the top end 406 of the stylus 202. Fiducials 408, 410, and 412 on the stylus 202 simplify the task of identifying the position and orientation of the stylus in each camera's image. The fiducial 408 is shown wrapping around the stylus 102 near the end 406 while the fiducials 410 and 412 are disposed along the shaft of the stylus and orthogonal to the fiducial 408. Other arrangements of fiducial positions are possible. The cameras 404 measures changes in the fiducials, and this information is sent to the control unit 114 (FIG. 1). These measurements are combined to create an estimate of the tip position 216 with respect to the hand-worn tracker 204.

FIGS. 5A-5D are diagrams of a joystick apparatus 500A-500D (collectively, "joystick apparatus 500") to implement the stylus tracking method 100 of FIG. 1, according to examples. The first tracking system of the joystick apparatus 500 is the sensor 104 coupled to the hand 208 by the sleeve 204, as before. The second tracking system of the joystick apparatus 500 comprises a stylus 502 with both a joystick sensor 504 and a z-axis sensor 508. Together, these sensors are able to discern fine movement of the stylus 502, in some examples.

Figure 5A:
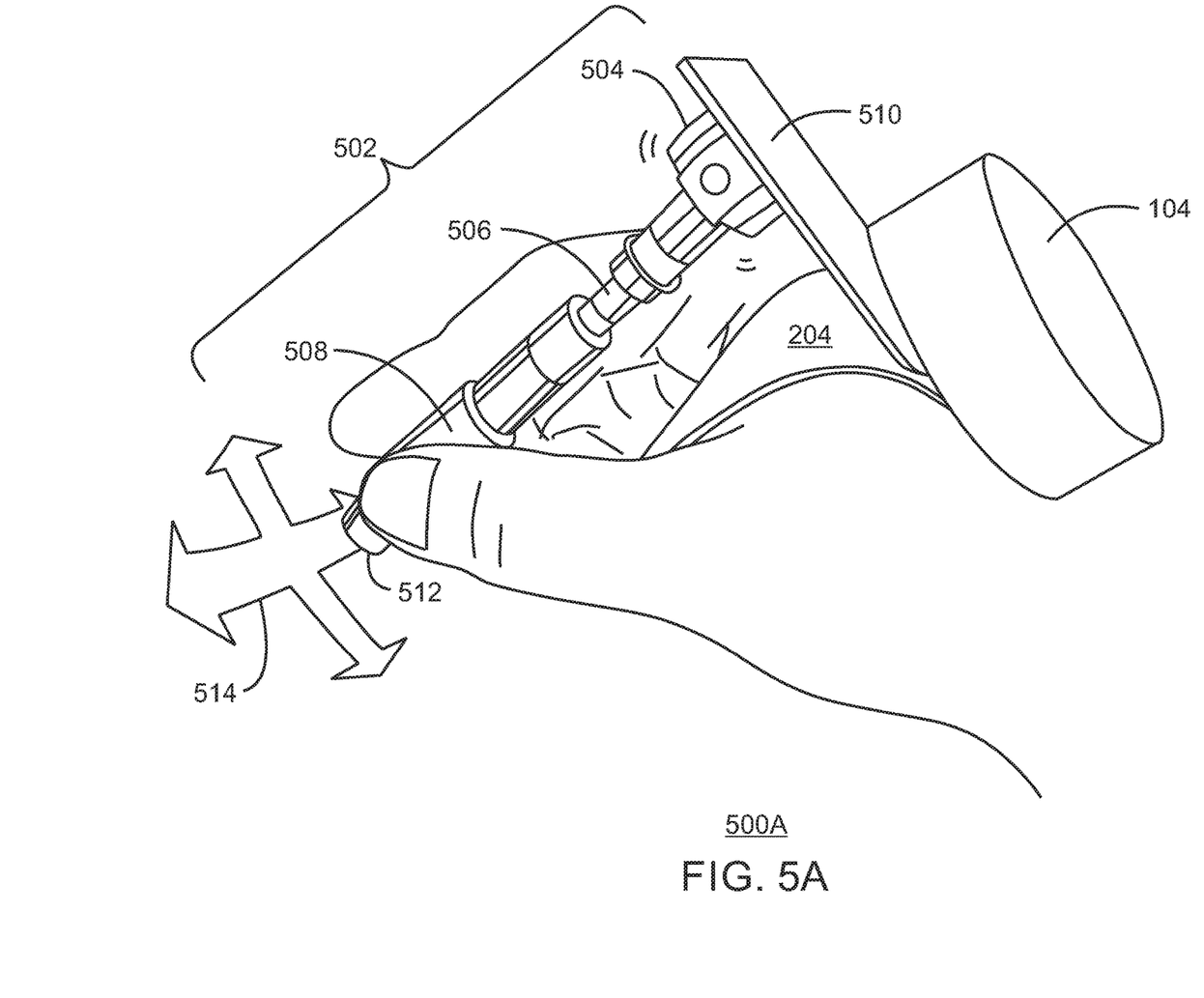
FIGS. 5A-5D are diagrams of a joystick apparatus to implement the stylus tracking method of FIG. 1, according to examples.

As shown in FIG. 5A, the stylus 502 of the joystick apparatus 500 comprises the joystick sensor 504 at one end, a shaft 506, the z-axis sensor 508, and a tip 510. In an example, the joystick sensor 504 detects changes in x-y angles when the user writes characters using the stylus 502. As with the mechanical apparatus 300 and the optical apparatus 400, the user does not need a writing surface to write characters with the stylus of the joystick apparatus 500.

In the joystick apparatus 500, the grip position of the stylus 502 is tracked via the z-axis sensor 508, in one example. For example, when the user is writing big letters, the user's grip on the stylus is a greater distance away from the tip, compared to when the user is writing small letters. Data from the z-axis sensor 508 may be combined with data from the joystick sensor 504 to accurately simulate the user's writing intent. Data retrieved by the z-axis sensor 508 and the joystick sensor 504 are sent to the control unit 114 (FIG. 1). In the illustration 500A, the stylus 502 is coupled to an attachment 510, which is itself coupled to the sensor 104 and sleeve 204. In an example, the attachment 510 enables an electrical connection, such as by copper wires, between the sensor 104 and the joystick sensor 504.

Figure 5B:
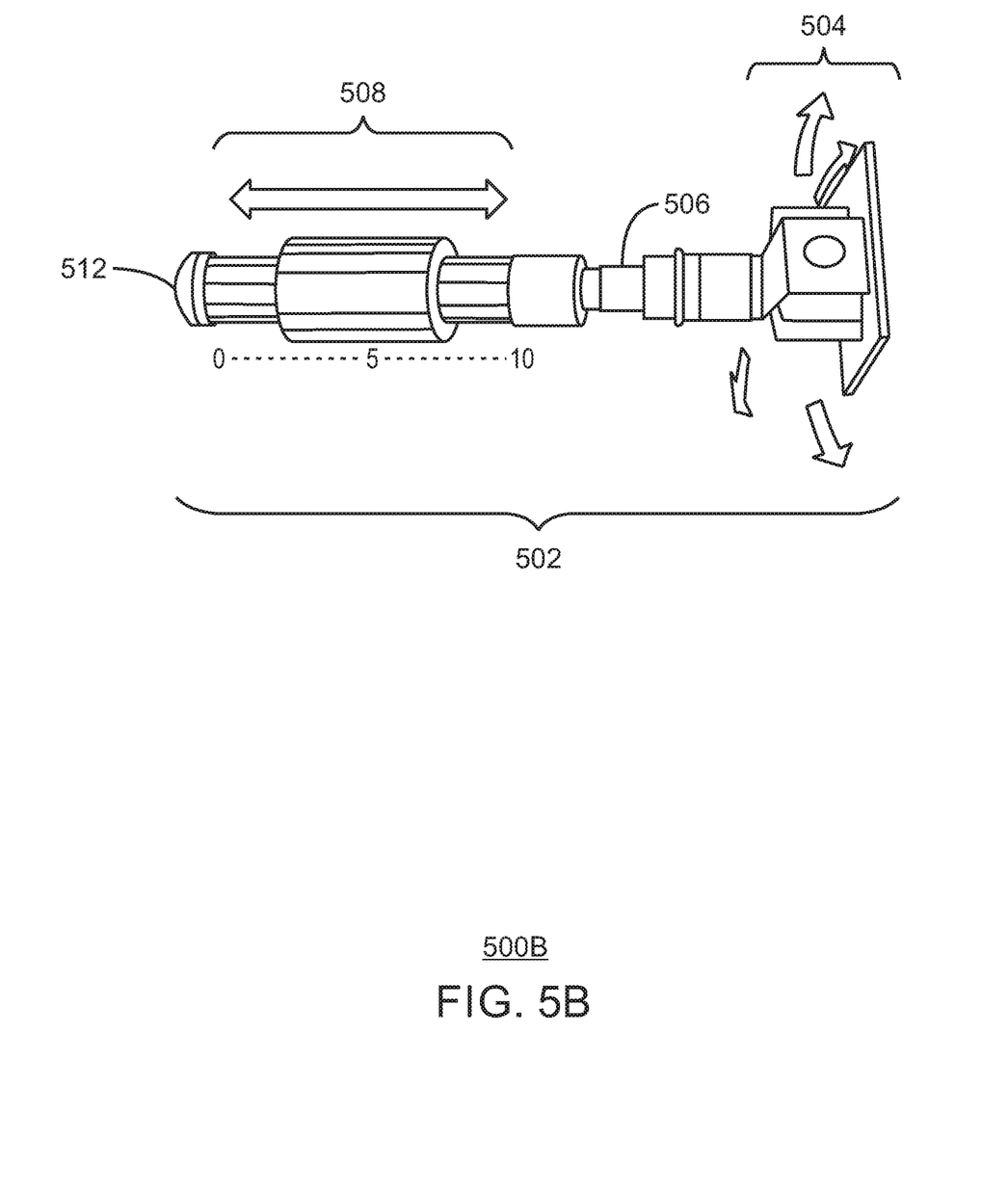

FIG. 5B shows the joystick apparatus 500B free of the user's hand. With the stylus 502 positioned horizontally, the joystick sensor 504, disposed at the end opposite the tip 512, is able to detect movement of the stylus 502 in a number of different directions, such as upward, downward, left-to-right, and right-to-left. The z-axis sensor 508, a cylindrical sleeve disposed along the shaft 506 of the stylus 502, instead detects up and down movement along the shaft. The z-axis sensor 508 may move all the way down the shaft 506 toward the tip 512, or up the shaft toward the joystick sensor 504.

Figure 5C:
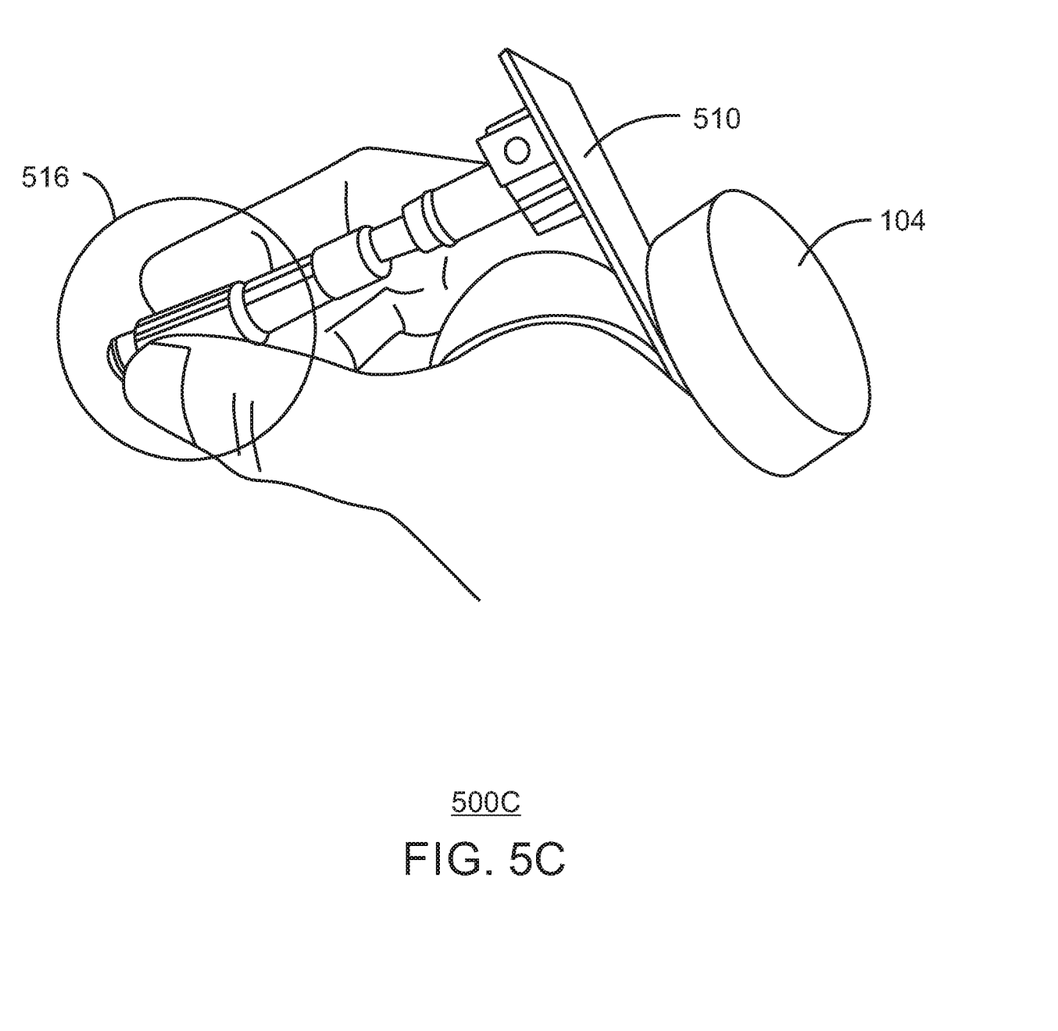
Figure 5D:
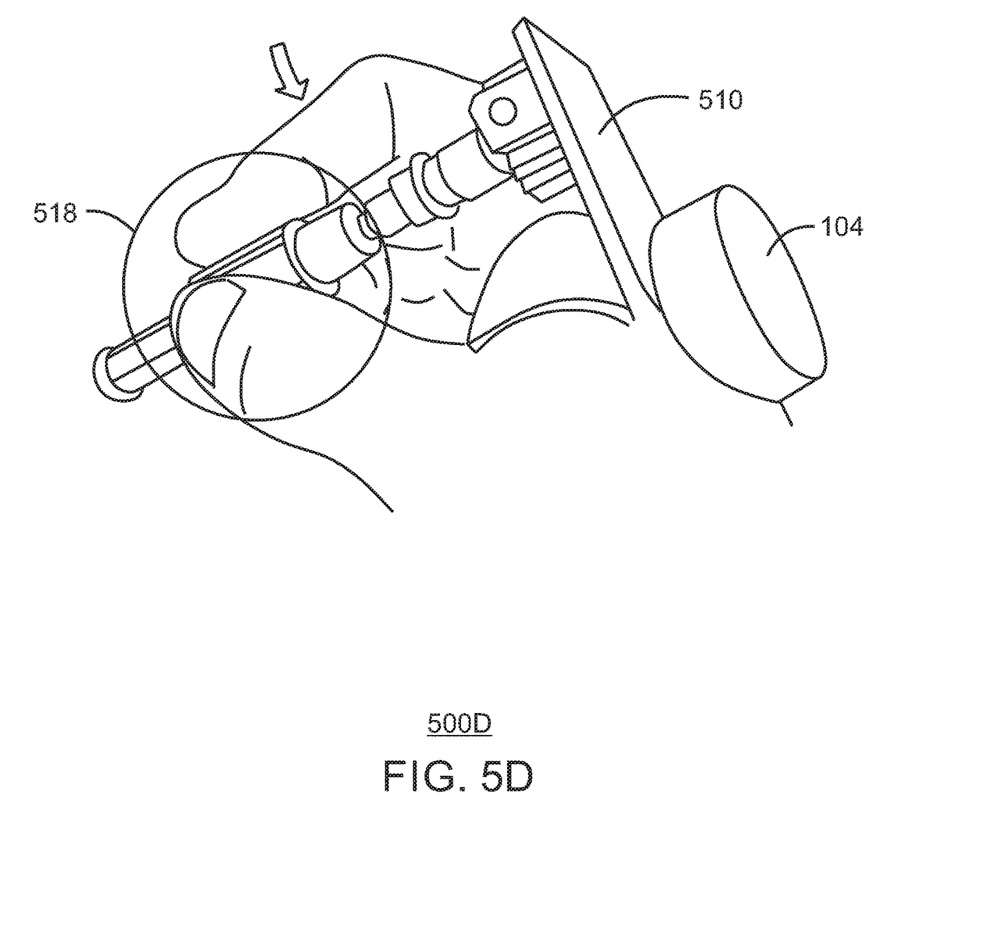

A legend beneath the z-axis sensor 508 in the illustration 500B indicates its position. The illustration 500C in FIG. 5C show the z-axis sensor 508 in the "0" position, or close to the tip 512. The illustration 500D in FIG. 5D shows the z-axis sensor 508 in the "10" position, which is farthest away from the tip 512.

Returning to FIG. 1, the first tracking system 106 works with the second tracking system 112 to determine the tip location 120 to be sent to the VR device 116. Thus, the sensor 104, which provides a first location of the user, is combined with the sensor or sensors, which provide the second location of the stylus. In examples, the second location is given in relation to the first location.

In some examples, the mechanical apparatus 300, the optical apparatus 400, and the joystick apparatus 500 may additionally include a sensor disposed on the stylus tip (e.g., tip sensor 110 in FIG. 1). In conjunction with the one or more other sensors of the second tracking system 112, the tip sensor may be used to increase the accuracy with which the stylus tip is tracked. For instance, the tip sensor 110 may be implemented as a contact sensor, which will determine when the stylus is being used on a surface. If the surface is assumed to be horizontal, then the stylus tracking method 100 has a useful constraint for calculation of the position of the tip. If the tip sensor 110 incorporates a mouse-like two-dimensional motion tracker, such as an optical mouse sensor, then that detailed delta-X, delta-Y tracking information may be fused with the information from the sensor 104 of the first tracking system 106 and the sensor(s) 108 of the second tracking system 112 to improve the accuracy of the estimation of the tip motion of the stylus.

The hand worn device may just "clip" over the base of the user's thumb as shown, allowing it be more readily picked up and put down (vs a glove).

Using either the mechanical apparatus 300, the optical apparatus 400, or the joystick apparatus 500, the stylus tracking method 100 enables the user to write "in the air" or on any available surface, in some examples. The stylus tracking method 100 thus combines pen movement sensing technology in the above-mentioned combinations with large spatial tracking applications.

The method 100 may have applications outside of AR/VR. Many computer applications may use input via a stylus. The method 100 and apparatus 300, 400, and 500 give the user the ability to use a stylus, not just on a digitizing surface, such as a tablet screen, but in a number of different applications in which precise motions of the stylus tip are desired.

Figure 6:
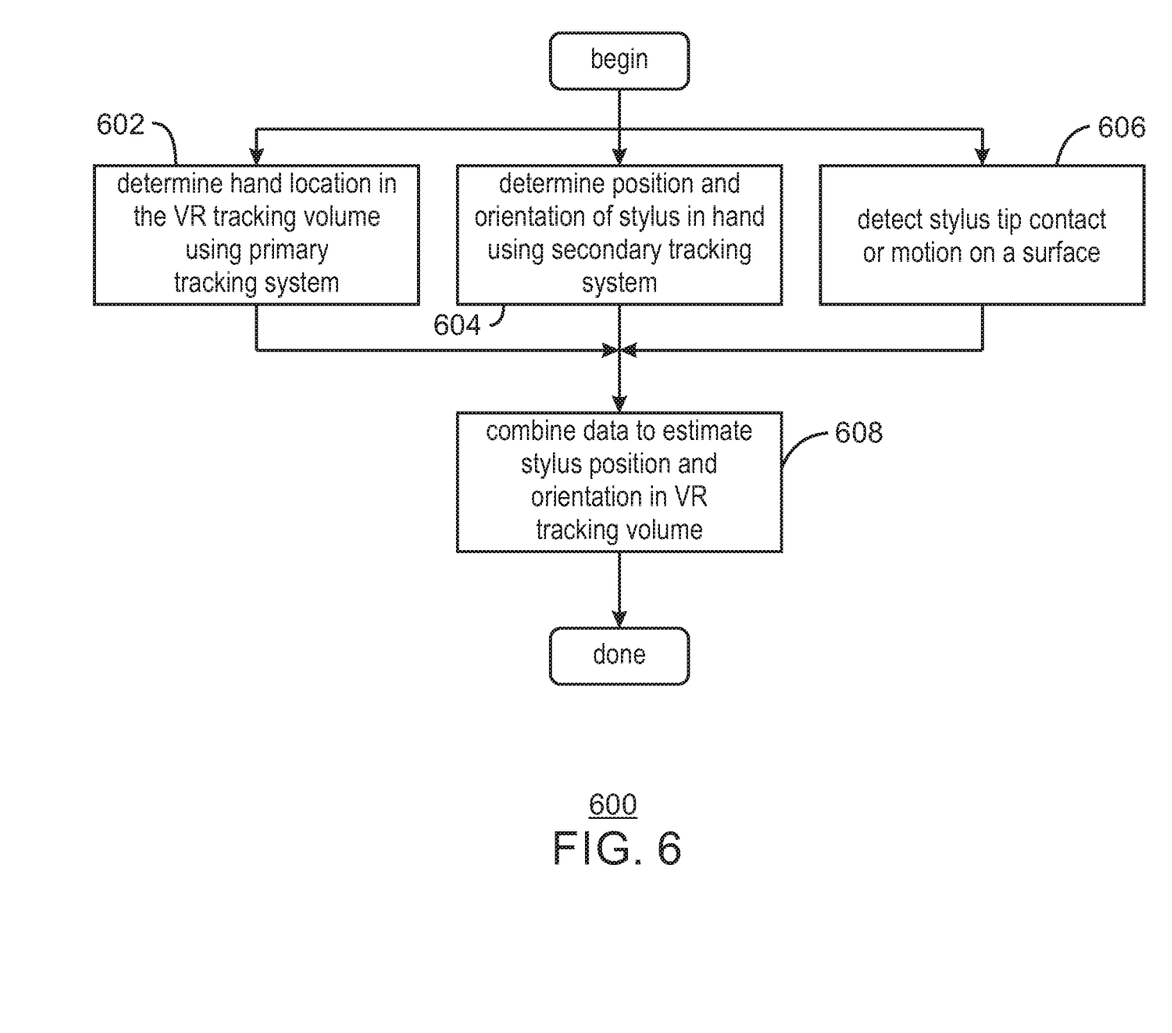
FIG. 6 is a flow diagram showing operation of the control unit from the stylus tracking method of FIG. 1, according to examples.

FIG. 6 is a flow diagram 600 illustrating operations that may be performed by the control unit 114 to determine the tip location 120 (FIG. 1), according to examples. The location of the user's hand is determined in the VR tracking volume by the primary tracking system (block 602). The position and orientation of the stylus, specifically, the tip of the stylus, is determined by the secondary tracking system (block 604). Where the optional tip sensor is available, the stylus tip contact or motion on a surface is detected (block 606). The information from the primary tracking system, the secondary tracking system, and the optional tip sensor are combined in the control unit to estimate the stylus position and orientation in the VR tracking volume (block 608). The operations 602, 604, and 606 are shown being performed together. However, these operations may be performed together in succession, in any order.

Figure 7:
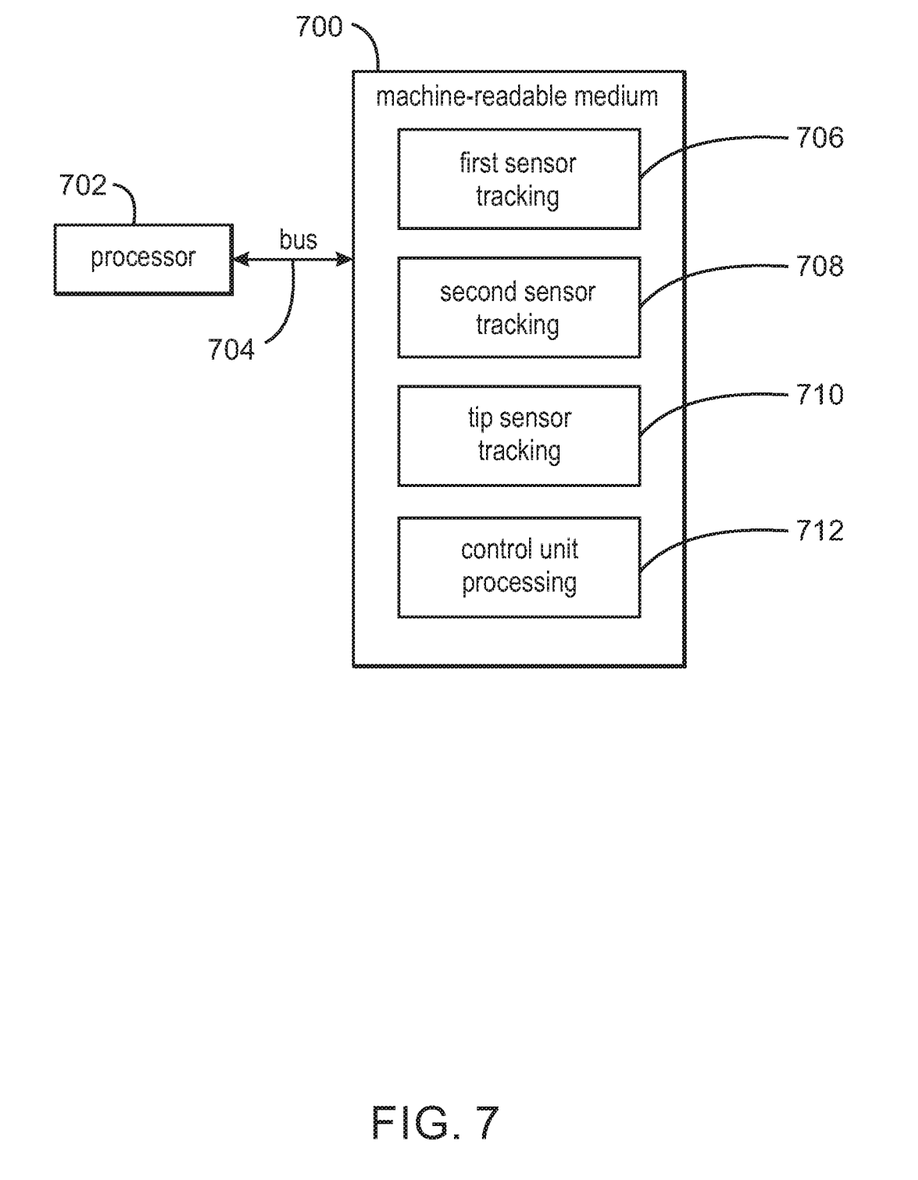
FIG. 7 is a block diagram of a non-transitory, machine-readable medium for performing the stylus tracking method of FIG. 1, according to examples.

FIG. 7 is a block diagram of a non-transitory, machine-readable medium for performing the stylus tracking method of FIG. 1, according to examples. A processor 702 may access the non-transitory, machine readable medium over a reader mechanism, as indicated by arrow 704.

The non-transitory, machine readable medium 700 may include code, specifically modules 706, 708, 710, and 712, to direct the processor 702 to implement operations for performing the stylus tracking method. First sensor tracking 706 determines the position of the hand holding the stylus, as described above. Second sensor tracking 708 determines the position of the stylus using one or more sensors, as described above. Optional tip sensor tracking 710 helps determine the position of the stylus tip when in contact with a surface. Control unit processing 712 gathers the data from the first sensor tracking 706, the second sensor tracking 708, and the tip sensor tracking 710, to supply the tip location to a VR device.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

What is claimed is:

1. An apparatus comprising:
a primary tracking system comprising a first sensor to monitor first movement of a user's hand, wherein the first sensor is attached to the user's hand; and
a secondary tracking system to monitor second movement of an object held in the user's hand and a position of the object, the secondary tracking system comprising at least one additional sensor, a pivot disposed coaxial with a knuckle of an index finger of the user's hand, and a rotational encoder to measure rotation of the pivot;
wherein the position is measured in relation to the first movement.

2. The apparatus of claim 1, wherein the secondary tracking system further detects an orientation of the object.

3. The apparatus of claim 1, wherein the secondary tracking system further comprises a second sensor to detect the object movement in a two-dimensional plane.

4. The apparatus of claim 3, wherein the secondary tracking system further comprises a third sensor to detect the object movement in a direction orthogonal to the two-dimensional plane.

5. The apparatus of claim 1,
wherein rotation of the pivot indicates up and down movement of the index finger.

6. The apparatus of claim 5, the secondary tracking system further comprising:
a second pivot disposed orthogonal to the pivot; and
a second rotational encoder to measure rotation of the second pivot;
wherein rotation of the second pivot indicates side-to-side movement of the index finger.

7. The apparatus of claim 1, the secondary tracking system further comprising:
a joystick sensor disposed at one end of the object, wherein the joystick sensor is coupled to the first sensor; and
a z-position sensor disposed along a shaft of the object.

8. An apparatus comprising:
a primary tracking system comprising a first sensor to monitor first movement of an object in a user's hand; and
a secondary tracking system comprising:
a second sensor to detect a position and orientation of the object within a working volume adjacent to the second sensor;
a structure partially encircling a top portion of the object, wherein the structure is equidistant from the top portion; and
a plurality of cameras affixed to the structure such that the top portion of the object is in view of each of the plurality of cameras;
wherein the position and orientation are measured in relation to the first movement.

9. The apparatus of claim 8, wherein a plurality of fiducials is disposed around the top portion of the object;
wherein the plurality of cameras tracks rotational movement of the object by observing movement of one or more of the plurality of fiducials.

10. The apparatus of claim 8, wherein the structure is affixed to the first sensor.

11. A method to track movement of a tip of a stylus in a human hand, the method comprising:
monitoring a first movement of the human hand by coupling a first sensor over a palm of the human hand;
monitoring a first stylus movement using a second sensor; and
monitoring a second stylus movement using a third sensor, wherein the second stylus movement is orthogonal to the first stylus movement;
wherein the first and second stylus movements are measured relative to the first movement of the human hand.

12. The method of claim 11, further comprising a controller to receive:
the first movement of the human hand from the first sensor;
the first stylus movement from the second sensor; and
the second stylus movement from the third sensor;
wherein the controller processes the first movement, then derives the first and second stylus movements based on the first movement.

13. The method of claim 12, further comprising coupling the first sensor to the second sensor.

14. The method of claim 11, further comprising:
a tip sensor disposed on the tip of the stylus, the tip sensor to detect contact with a surface or motion of the tip over a surface.

* * * * *